US010330016B2

(12) United States Patent
Harder et al.

(10) Patent No.: US 10,330,016 B2
(45) Date of Patent: Jun. 25, 2019

(54) GAS TURBINE ENGINE STARTER REDUCTION GEAR TRAIN WITH STACKED PLANETARY GEAR SYSTEMS

(71) Applicant: Hamilton Sundstrand Corporation, Charlotte, NC (US)

(72) Inventors: Benjamin T. Harder, DeKalb, IL (US); Matthew Allen Slayter, Rockford, IL (US); Brian McMasters, Caledonia, IL (US); James Vandung Nguyen, Rockford, IL (US); Dwayne Leon Wilson, Rockford, IL (US); Paul F. Fox, Loves Park, IL (US); Richard Alan Davis, Stillman Valley, IL (US); Richard R. Hergert, Rockton, IL (US); Jeffrey Todd Roberts, Winnebago, IL (US); Jeff A. Brown, Cherry Valley, IL (US); Daniel Richard Walker, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 521 days.

(21) Appl. No.: 15/201,837

(22) Filed: Jul. 5, 2016

(65) Prior Publication Data
US 2018/0010522 A1 Jan. 11, 2018

(51) Int. Cl.
F02C 7/36 (2006.01)
F02C 7/275 (2006.01)
F16H 1/46 (2006.01)
F01D 21/12 (2006.01)
F01D 25/34 (2006.01)
F02C 7/277 (2006.01)
F02C 7/32 (2006.01)

(52) U.S. Cl.
CPC .............. F02C 7/275 (2013.01); F01D 21/12 (2013.01); F01D 25/34 (2013.01); F02C 7/277 (2013.01);
(Continued)

(58) Field of Classification Search
CPC .... F02C 7/275; F02C 7/32; F02C 7/36; F02C 7/277; F01D 25/34; F01D 21/12;
(Continued)

(56) References Cited

U.S. PATENT DOCUMENTS 3,793,905 A 2/1974 Black et al.
3,951,008 A 4/1976 Schneider et al.
(Continued)

FOREIGN PATENT DOCUMENTS

EP 2320067 A2 5/2011
WO 2016069303 A1 5/2016

OTHER PUBLICATIONS

Extended European Search Report for Application No. 17179515.6-1607 dated Nov. 20, 2017 (8 pp.).
(Continued)

Primary Examiner — Eldon T Brockman
(74) Attorney, Agent, or Firm — Cantor Colburn LLP

(57) ABSTRACT

According to an aspect, a system for a gas turbine engine includes a reduction gear train operable to drive rotation of a starter gear train that interfaces to an accessory gearbox of the gas turbine engine. The reduction gear train includes a starter interface gear that engages the starter gear train, a core-turning clutch operably connected to the starter interface gear, and a plurality of stacked planetary gear systems operably connected to the core-turning clutch and a core-turning input. The system also includes a mounting pad including an interface to couple a core-turning motor to the core-turning input of the reduction gear train.

20 Claims, 5 Drawing Sheets

(52) U.S. Cl.
CPC .................. *F02C 7/32* (2013.01); *F02C 7/36* (2013.01); *F16H 1/46* (2013.01); *F05D 2220/32* (2013.01); *F05D 2220/323* (2013.01); *F05D 2230/60* (2013.01); *F05D 2260/40311* (2013.01); *F05D 2260/85* (2013.01)

(58) Field of Classification Search
CPC ............. F16H 1/46; F05D 2260/40311; F05D 2230/60; F05D 2220/32; F05D 2220/323; F05D 2260/85
See application file for complete search history.

(56) References Cited

U.S. PATENT DOCUMENTS

| | | | | |
|---|---|---|---|---|
| 7,481,062 | B2* | 1/2009 | Gaines | F02C 7/36 60/792 |
| 7,882,691 | B2* | 2/2011 | Lemmers, Jr. | F02C 7/275 475/6 |
| 2006/0188372 | A1 | 8/2006 | Hansen | |
| 2007/0151258 | A1* | 7/2007 | Gaines | F02C 7/36 60/792 |
| 2009/0007569 | A1* | 1/2009 | Lemmers, Jr. | F02C 7/275 60/792 |
| 2014/0026689 | A1* | 1/2014 | Nakamura | F02N 11/006 74/6 |
| 2014/0318144 | A1 | 10/2014 | Lazzeri et al. | |
| 2017/0234234 | A1* | 8/2017 | Pech | F02N 11/0859 290/31 |
| 2018/0010523 | A1 | 1/2018 | Harder et al. | |

OTHER PUBLICATIONS

Extended European Search Report for Application No. 17179519.8-1607 dated Nov. 16, 2017 (9 pp.).
Extended European Search Report for Application No. 17179784.6-1607 dated Nov. 23, 2017 (10 pp.).

* cited by examiner

GAS TURBINE ENGINE STARTER REDUCTION GEAR TRAIN WITH STACKED PLANETARY GEAR SYSTEMS

BACKGROUND

The subject matter disclosed herein generally relates to engine starter systems, and more specifically to interfacing a reduction gear train for a core-turning motor with a starter of a gas turbine engine.

Modern aircraft gas turbine engines operate with relatively small radial clearances in order to optimize the efficiency of the engine. When such an engine is shut down, heat from the engine core rises to the top of the engine case, and this uneven distribution of heat can result in the engine rotor axis bending or "bowing". If an engine is re-started in this condition, it can result in potential damage or reduced performance. One potential solution to this is to rotate the engine at very low speed after it is turned off. By allowing the rotor to rotate slowly, heat is dissipated evenly and rotor bow can be minimized. A pneumatic turbine starter can be used to both start and motor (i.e., turn at a speed less than the starting speed) the engine using available compressed air from a variety of sources. However, both an air valve used to regulate the compressed air supplied to the starter and the starter itself are typically designed primarily for short duration transient operations, not continuous motoring at low speeds. Regulating the air supply and operating at moderate torque and speeds of normal engine motoring can be detrimental to the life of the air valve and starter.

SUMMARY

According to one embodiment, a system for a gas turbine engine includes a reduction gear train operable to drive rotation of a starter gear train that interfaces to an accessory gearbox of the gas turbine engine. The reduction gear train includes a starter interface gear that engages the starter gear train, a core-turning clutch operably connected to the starter interface gear, and a plurality of stacked planetary gear systems operably connected to the core-turning clutch and a core-turning input. The system also includes a mounting pad including an interface to couple a core-turning motor to the core-turning input of the reduction gear train.

In addition to one or more of the features described above, or as an alternative to any of the foregoing embodiments, further embodiments may include where the starter interface gear engages a planet gear of the starter gear train, and the starter gear train is operably connected to the accessory gearbox through a starter clutch.

In addition to one or more of the features described above, or as an alternative to any of the foregoing embodiments, further embodiments may include where the core-turning clutch is an overrunning clutch.

In addition to one or more of the features described above, or as an alternative to any of the foregoing embodiments, further embodiments may include where the stacked planetary gear systems further include a stacked series of coaxially aligned sun gears that each drives a plurality of planet gears.

In addition to one or more of the features described above, or as an alternative to any of the foregoing embodiments, further embodiments may include where a distal sun gear is operably connected by a drive shaft to the core-turning input, and the distal sun gear is operably connected to a first set of the planet gears of the stacked planetary gear systems.

In addition to one or more of the features described above, or as an alternative to any of the foregoing embodiments, further embodiments may include where the first set of planet gears is operably coupled to a carrier including one of the coaxially aligned sun gears that in turn drives one or more subsequent sets of the planet gears and the coaxially aligned sun gears.

In addition to one or more of the features described above, or as an alternative to any of the foregoing embodiments, further embodiments may include where the stacked planetary gear systems include four planetary gear systems coaxially positions about the drive shaft, and the core-turning clutch is coaxially positioned about the drive shaft between the stacked planetary gear systems and the core-turning motor.

According to another embodiment, an integrated starter and core-turning system for a gas turbine engine is provided. The integrated starter and core-turning system includes a starter including a starter gear train that interfaces to an accessory gearbox of the gas turbine engine and a reduction gearbox. The reduction gearbox includes a reduction gear train operable to drive rotation of the starter gear train. The reduction gear train includes a starter interface gear operably connected to the starter gear train, a core-turning clutch operably connected to the starter interface gear, and a plurality of stacked planetary gear systems operably connected to the core-turning clutch and a core-turning input. The reduction gearbox also includes a mounting pad including an interface to couple a core-turning motor to the core-turning input of the reduction gear train.

In addition to one or more of the features described above, or as an alternative to any of the foregoing embodiments, further embodiments may include where the starter is a turbine that drives the starter gear train, and the core-turning motor is an electric motor.

In addition to one or more of the features described above, or as an alternative to any of the foregoing embodiments, further embodiments may include where the starter and the reduction gearbox are integrally formed within an outer housing.

According to a further embodiment, a method of installing a reduction gear train through a starter of a gas turbine engine is provided. The method includes arranging a plurality of stacked planetary gear systems of the reduction gear train in a reduction gearbox and coupling the stacked planetary gear systems with a core-turning clutch operably connected to a starter interface gear. The method also includes engaging the starter interface gear with a starter gear train of the starter that interfaces to an accessory gearbox of the gas turbine engine, aligning a drive shaft coaxially with the stacked planetary gear systems and the core-turning clutch, and coupling a core-turning motor with the reduction gear train at a core-turning input of the drive shaft.

In addition to one or more of the features described above, or as an alternative to any of the foregoing embodiments, further embodiments may include engaging a distal sun gear operably connected to the drive shaft with a first set of the planet gears operably coupled to a carrier including one of the coaxially aligned sun gears configured to drive one or more subsequent sets of the planet gears and the coaxially aligned sun gears.

In addition to one or more of the features described above, or as an alternative to any of the foregoing embodiments, further embodiments may include coupling a first housing portion of the reduction gearbox with a second housing portion of the starter to establish an integrally formed outer housing of the reduction gearbox and the starter.

Technical effects of embodiments of the present disclosure include transmitting torque in a starter and core-turning system for a gas turbine engine using a reduction gear set and a core-turning motor operable to rotate an engine core for bowed rotor prevention/mitigation and also allow pneumatic starting of the engine at higher speeds of rotation.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

The detailed description explains embodiments of the present disclosure, together with advantages and features, by way of example with reference to the drawings.

DETAILED DESCRIPTION

Figure 1:
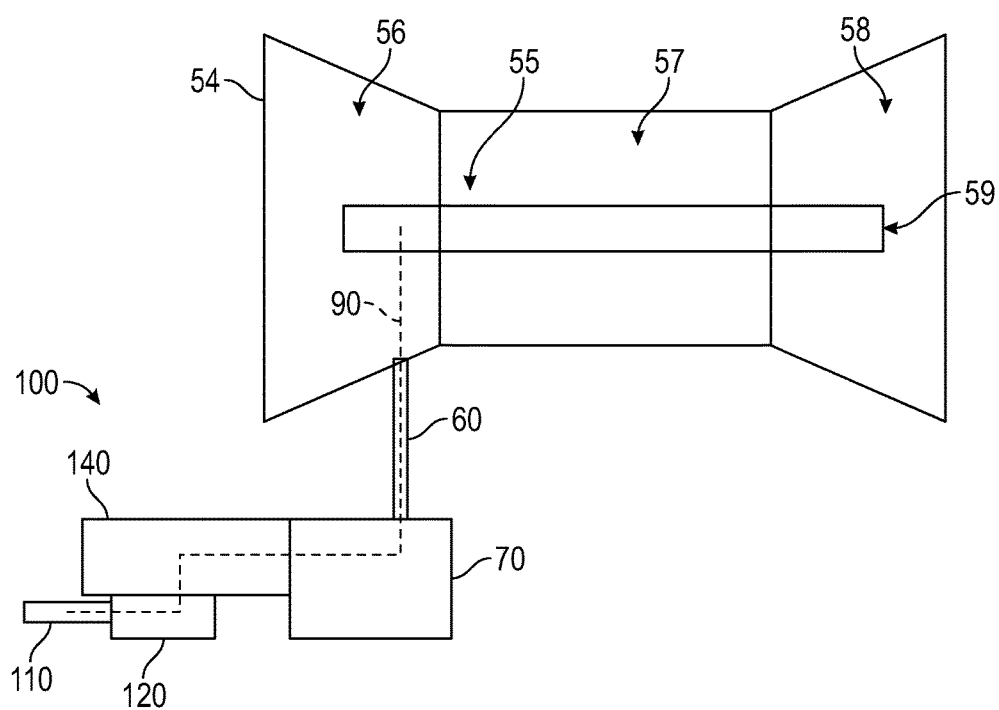
FIG. 1 is a block diagram of an engine and associated system, according to an embodiment of the present disclosure.
Figure 2:
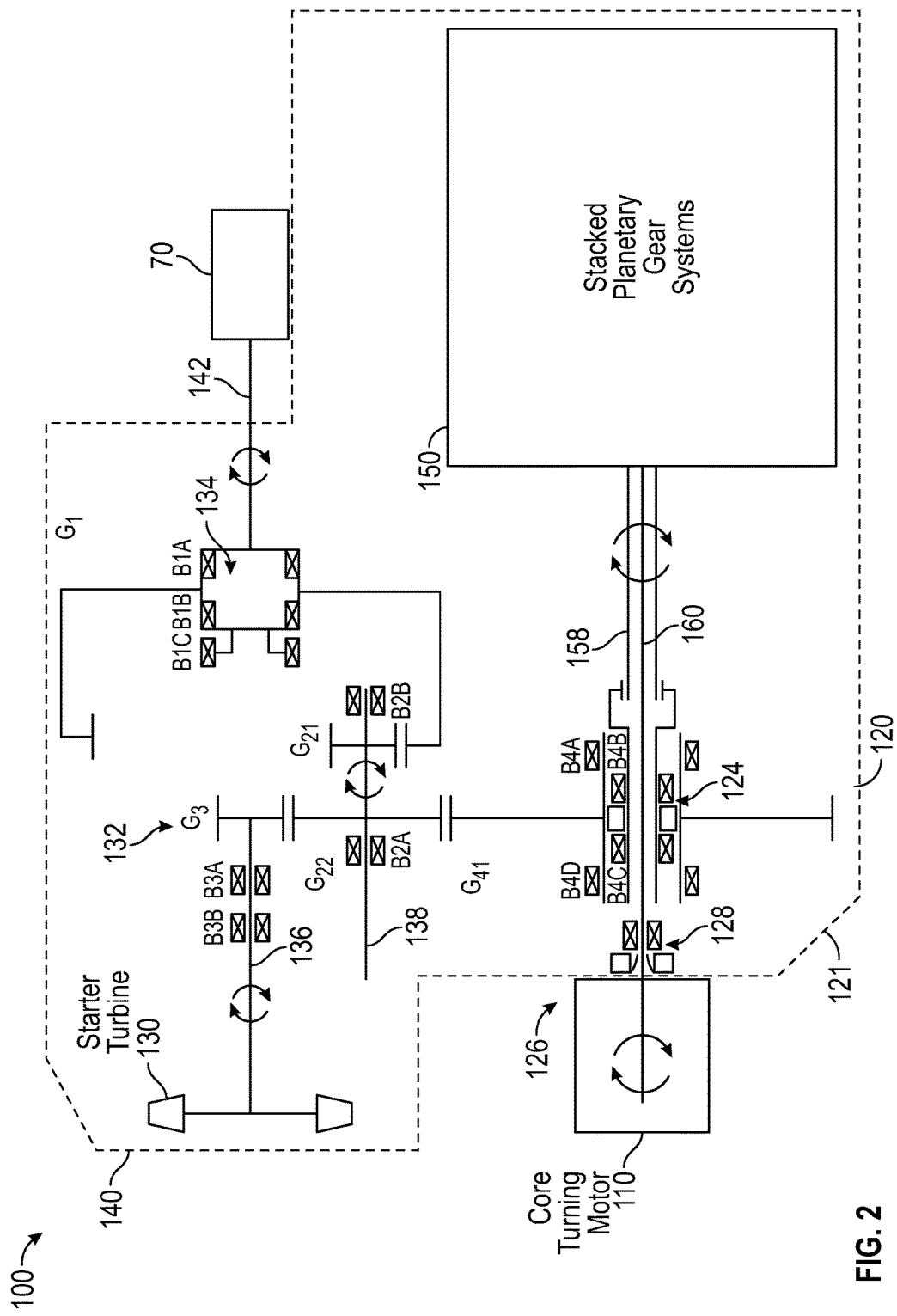
FIG. 2 is a schematic view of a starter and core-turning system, according to an embodiment of the present disclosure.
Figure 3:
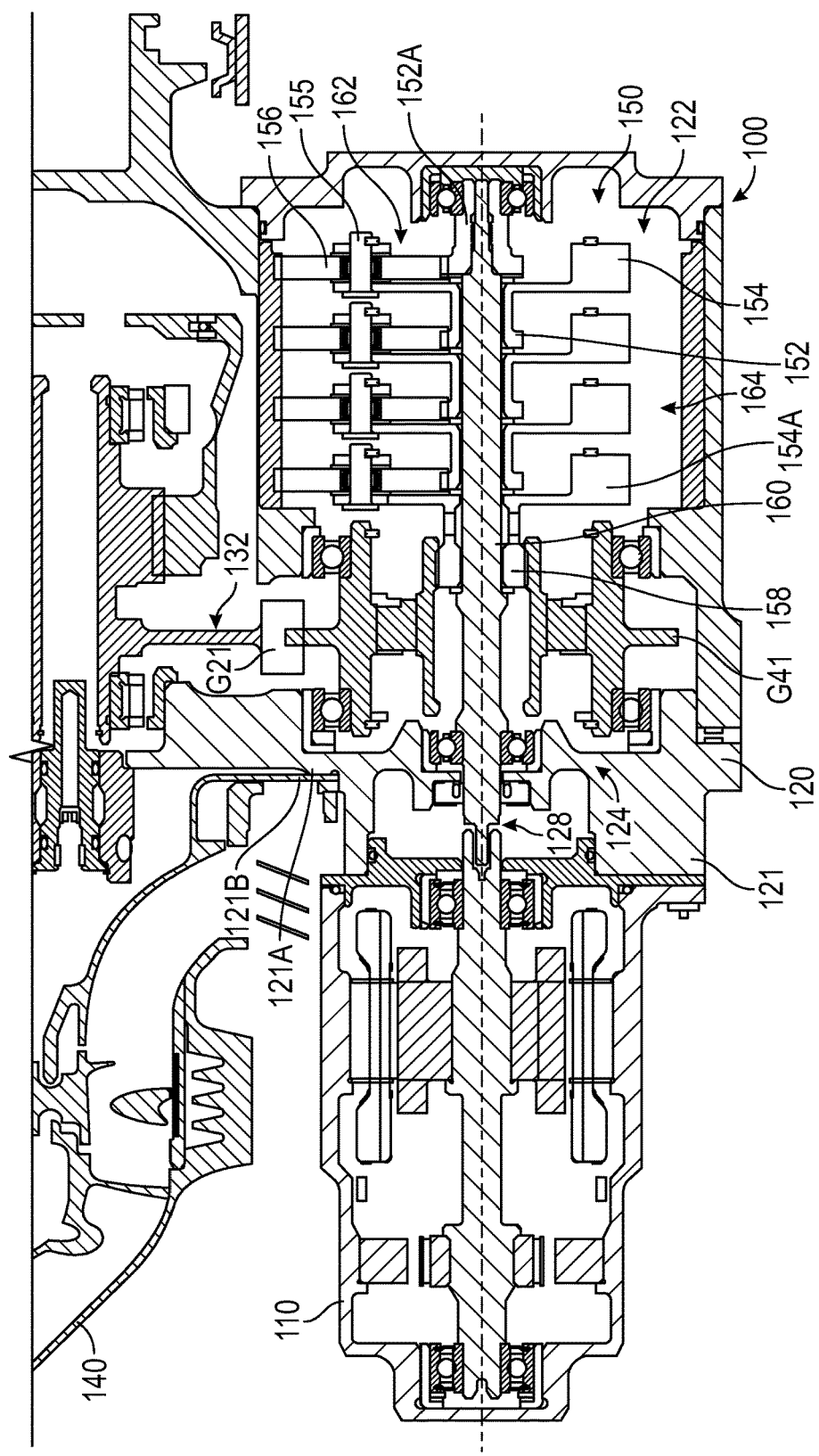
FIG. 3 is a sectional view of a core-turning system, according to an embodiment of the present disclosure.

Referring now to FIGS. 1-3, various embodiments of the present disclosure are illustrated. FIG. 1 shows a block diagram of an engine 54, such as a gas turbine engine, and an associated system 100, according to an embodiment of the present disclosure. FIG. 2 shows a schematic view of the system 100 of FIG. 1, according to an embodiment of the present disclosure. FIG. 3 is a sectional view of a portion of the system 100 of FIG. 1, according to an embodiment of the present disclosure.

The system 100 includes a reduction gearbox 120 and a starter 140 that may be integrally formed within an outer housing 121. The system 100 is operably connected to the engine 54 through an accessory gear box 70 and drive shaft 60 (e.g., a tower shaft), as shown in FIG. 1. Operable connections can include gear mesh connections that in some instances can be selectively engaged or disengaged, for instance, through one or more clutches. The reduction gearbox 120 includes a reduction gear train 122 within the outer housing 121. A core-turning motor 110 is operably connected to the reduction gear train 122 at a mounting pad 126 that interfaces to a core-turning input 128 of the reduction gear train 122. In an embodiment, the core-turning motor 110 may be an electric motor. A core-turning clutch 124 interfaces the reduction gear train 122 to a starter gear train 132 of a starter 140. The core-turning clutch 124 may be operably connected to accessory gearbox 70 through the starter 140 and a starter output shaft 142. In operation, the core-turning clutch 124 may engage and disengage the reduction gear train 122 with the starter gear train 132. The starter 140 can also include a starter clutch 134 that operably connects the accessory gearbox 70 to the starter gear train 132.

A starter turbine 136 of the starter 140 is configured to initiate a startup process of the engine 54 by getting a rotor shaft 59 of engine core 55 (e.g., a starting spool) of the engine 54 rotating. The rotor shaft 59 operably connects an engine compressor 56 to an engine turbine 58. Thus, once the engine compressor 56 starts spinning, air is pulled into combustion chamber 57 and mixes with fuel for combustion. Once the air and fuel mixture combusts in the combustion chamber 57, a resulting compressed gas flow drives rotation of the engine turbine 58, which rotates the engine turbine 58 and subsequently the engine compressor 56. Although only a single instance of an engine compressor-turbine pair is depicted in the example of FIG. 1, it will be understood that embodiments can include any number of spools, such as high/mid/low pressure engine compressor-turbine pairs within engine 54.

The starter 140 is further operable to drive rotation of the rotor shaft 59 at a lower speed for a longer duration than typically used for engine starting in a motoring mode of operation (also referred to as dry motoring) to prevent/reduce a bowed rotor condition. The core-turning motor 110 is operable to slowly rotate the rotor shaft 59 at a much slower speed than is typically used for motoring or engine starting, for instance, less than 10 revolutions per minute as compared to greater than 1000 revolutions per minute. The core-turning motor 110 can be used to prevent or slowly reduce a bowed rotor condition. If a bowed rotor condition has developed, for instance, due to a hot engine shutdown and without taking further immediate action, motoring may be performed by the starter 140 to more rapidly reduce a bowed rotor condition but may reduce service life of some starter system components. If a bowed rotor condition has not yet developed, the rotor shaft 59 can be slowly rotated by the core-turning motor 110 while allowing time for substantially even cooling within the engine 54.

As depicted in the example of FIGS. 1 and 2, the core-turning motor 110 is connected to the engine 54 by a drive line 90, which runs from the core-turning motor 110, to the reduction gear train 122 through the core-turning clutch 124, to the starter 140, to the starter output shaft 142, to the accessory gearbox 70, to the drive shaft 60, and finally to the rotor shaft 59 of the engine 54. The core-turning motor 110 operates at a high angular velocity to get the rotor shaft 59 of the engine 54 turning at a low angular velocity through the reduction ratio established by the reduction gear train 122. When engine core-turning is active to prevent a bowed rotor condition, both the starter clutch 134 and the core-turning clutch 124 are engaged to enable the core-turning motor 110 to drive rotation of the rotor shaft 59. During the startup process, the starter clutch 134 is engaged so that rotational toque is transferred from the starter gear train 132 to the rotor shaft 59 through the drive line 90; however, the core-turning clutch 124 is disengaged to prevent the starter 140 from back driving the core-turning motor 110. Once the startup process has been completed, the starter 140 is disengaged from the engine 54 to prevent over-speed conditions when the engine 54 operates at its normal higher speeds. Thus, the starter clutch 134 disengages the starter gear train 132 once the startup process has been completed.

The starter 140 can be implemented as a pneumatic starter that receives compressed air at starter turbine 130, which is attached to a gear G3 through a starter input shaft 136 supported by bearings B3A and B3B. The starter turbine 130 reaction transmits torque through the gear 34 to one or more planet gears G22. In FIG. 2, the system 100 is depicted as a multi-stage reduction gear system with torque transmitted through planet gear G22 to gear G21 by intermediate shaft 138 supported by bearings B2A and B2B. Torque is then transmitted from gear G21 to ring gear G1. The ring gear G1 transmits torque through the starter clutch 134 supported by bearings B1A, B1B, and B1C to the starter output shaft 142, which is coupled to the accessory gearbox 70 and subsequently to the engine rotor shaft 59. Once either an engine motoring event is complete or the engine 54 has successfully starter, a compressed air supply can be turned off by an upstream air valve, and the starter clutch 134 allows the internal components of the starter 140 to cease operation as the engine 54 continues to operate. During this operating mode (e.g., engine ignition achieved), the reduction gearbox 120 and core-turning motor 110 are not required to operate. Embodiments ensure the reduction gearbox 120 and the core-turning motor 110 are decoupled from the starter gear train 132 through the core-turning clutch 124 which allows gear G41 to rotate independent of the reduction gearbox 120 and the core-turning motor 110. In this way embodiments do not adversely affect engine start and motoring operation of the starter 140.

To turn the engine core 55 in a bowed rotor prevention mode after engine shutdown, core-turning motor 110 is turned on, which drives a plurality of stacked planetary gear systems 150 of the reduction gear train 122 to reduce rotational speed and multiply the torque output of the core-turning motor 110. Torque can be transmitted through the core-turning clutch 124 and starter interface gear G41 to planet gear G22 of the starter gear train 132 (i.e., G41/G22 gear mesh), and the starter gear train 132 can be used to deliver torque to turn the engine core 55 at a targeted speed.

As depicted in the example of FIG. 2, the core-turning clutch 124 is operably connected to the starter interface gear G41. The core-turning clutch 124 is supported by bearings B4A, B4B, B4C, and B4D. The stacked planetary gear systems 150 are operably connected to the core-turning clutch 124 through shaft 158. A drive shaft 160 can be coaxially arranged with the core-turning clutch 124, shaft 158, and stacked planetary gear systems 150. Core-turning input 128 of drive shaft 160 transfers torque from the core-turning motor 110 through drive shaft 160 to drive rotation within the stacked planetary gear systems 150.

An example of the stacked planetary gear systems 150 is depicted in greater detail in FIG. 3. The stacked planetary gear systems 150 can include a stacked series of coaxially aligned sun gears 152 that each drives a plurality of planet gears 156. A distal sun gear 152A is operably connected by drive shaft 160 to the core-turning input 128. The distal sun gear 152A is operably connected to a first set 162 of the planet gears 156 of the stacked planetary gear systems 150. The first set 162 of planet gears 156 is operably coupled by pins 155 to a carrier 154 including one of the coaxially aligned sun gears 152 that in turn drives one or more subsequent sets 164 of the planet gears 156 and the coaxially aligned sun gears 152. In an embodiment, the stacked planetary gear systems 150 include four planetary gear systems coaxially positioned about the drive shaft 160. An end carrier 154A of the stacked planetary gear systems 150 can include shaft 158 that interfaces with the core-turning clutch 124. The core-turning clutch 124 can be coaxially positioned about the drive shaft 160 between the stacked planetary gear systems 150 and the core-turning motor 110. The starter 140 and the reduction gearbox 120 can be integrally formed within outer housing 121, for instance, where a first housing portion 121A of the reduction gearbox 120 is coupled with a second housing portion 121B of the starter 140.

Figure 4:
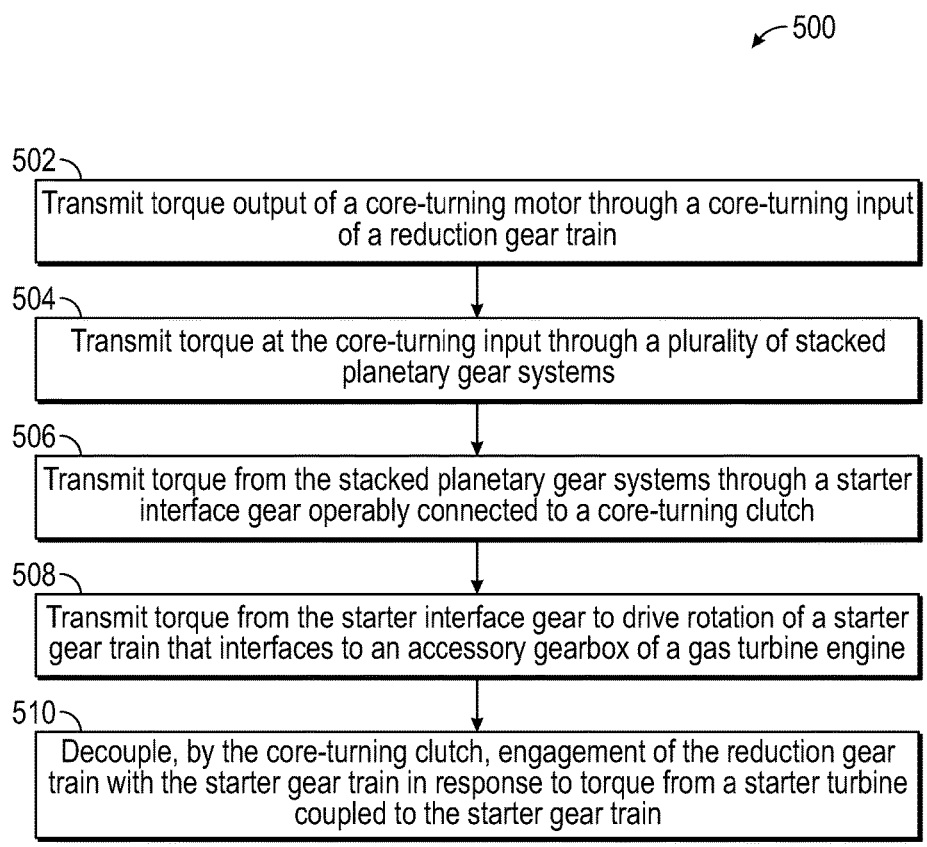
FIG. 4 is a flow process illustrating a method of transmitting torque in a system for a gas turbine engine according to an embodiment of the present disclosure.

Referring now to FIG. 4 while referencing components of the system 100 of FIGS. 1-3, a flow process illustrating a method 500 of transmitting torque in the system 100 of FIGS. 1-3 is depicted, according to an embodiment of the present disclosure. At block 502, torque output of core-turning motor 110 is transmitted through core-turning input 128 of reduction gear train 122 of the system 100. At block 504, torque is transmitted at the core-turning input 128 through the stacked planetary gear systems 150. At block 506, torque is transmitted from the stacked planetary gear systems 150 through starter interface gear G41 operably connected to core-turning clutch 124. At block 508, torque is transmitted from the starter interface gear G41 to drive rotation of starter gear train 132 that interfaces to accessory gearbox 70 of the gas turbine engine 54. Torque from starter turbine 130 can be transmitted through the starter gear train 132 to the accessory gearbox 70 when higher speed rotation of the engine core 55 is needed, for instance, at engine start or during dry motoring. At block 510, the core-turning clutch 124 can decouple engagement of the reduction gear train 122 with the starter gear train 132 in response to the torque from the starter turbine 130, for instance, where the core-turning clutch 124 is an overrunning clutch. Similarly, the starter clutch 134 can decouple engagement between the starter 140 and the accessory gearbox 70 to prevent the gas turbine engine 54 from back-driving the starter 140 and the core-turning motor 110 at higher operating speeds, for instance, after the gas turbine engine 54 has been started.

Figure 5:
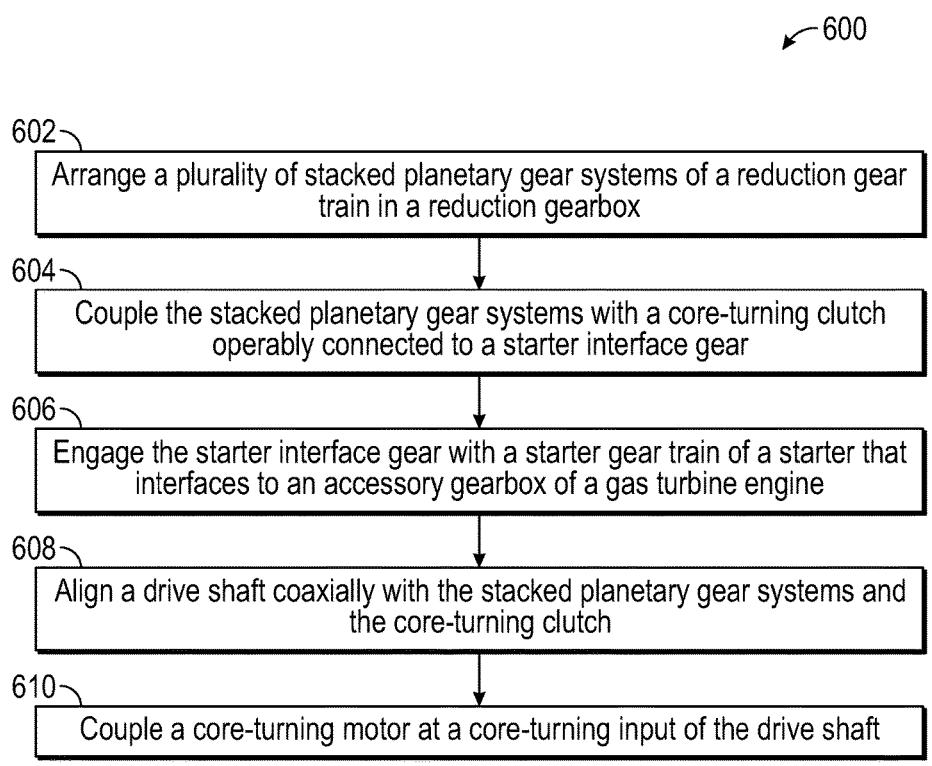
FIG. 5 is a flow process illustrating a method of installing a reduction gear train through a starter of a gas turbine engine according to an embodiment of the present disclosure.

Referring now to FIG. 5 while referencing components of the system 100 of FIGS. 1-3, a flow process illustrating a method 600 of installing reduction gear train 122 through the starter 140 of gas turbine engine 54 of FIGS. 1-3 is depicted, according to an embodiment of the present disclosure. At block 602, stacked planetary gear systems 150 of the reduction gear train 122 are arranged in the reduction gearbox 120. At block 604, the stacked planetary gear systems 150 are coupled with core-turning clutch 124 operably connected to starter interface gear G41. At block 606, the starter interface gear G41 is engaged with starter gear train 132 of the starter 140 that interfaces to accessory gearbox 70 of the gas turbine engine 54. The starter interface gear G41 can engage planet gear G21 of the starter gear train 132, and the starter gear train 132 can be operably connected to the accessory gearbox 70 through starter clutch 134.

At block 608, drive shaft 160 is coaxially aligned with the stacked planetary gear systems 150 and the core-turning clutch 124. Distal sun gear 152A can be operably connected to the drive shaft 160 with a first set 162 of the planet gears 156 operably coupled to a carrier 154 including one of the coaxially aligned sun gears 152 configured to drive one or more subsequent sets 164 of the planet gears 156 and the coaxially aligned sun gears 152.

At block 610, core-turning motor 110 is coupled with the reduction gear train 122 at core-turning input 128 of the drive shaft 160. A first housing portion 121A of the reduction gearbox 120 can be coupled with a second housing portion 121B of the starter 140 to establish an integrally formed outer housing 121 of the reduction gearbox 120 and the starter 140.

While the above description has described the flow processes of FIGS. 4 and 5 in a particular order, it should be appreciated that unless otherwise specifically required in the attached claims that the ordering of the steps may be varied.

Embodiments can be integrated with an existing pneumatic starter, providing dual function for a single gearbox-mounted component. The core-turning clutch and the starter clutch allow normal engine starting and motoring operation and prevent rotation when not required. The various gear trains provide a compact design to allow for optimization of the physical system envelope. The possible gear ratios obtained in embodiments allow a compact motor to be used at typical motor operating speeds, while still meeting the starter output torque requirements for turning an engine core. The number of gear elements and sizing can be adjusted to optimize speed and output torque for a specific engine application. Enabling a motor-driven operating mode allows finer control of the engine rotor speed, and reduces both the speed and loading of the starter gear train, which reduces the operating mode impact on product life.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A system for a gas turbine engine comprising:
   a reduction gear train operable to drive rotation of a starter gear train that interfaces to an accessory gearbox of the gas turbine engine, the reduction gear train comprising:
      a starter interface gear that engages the starter gear train;
      a core-turning clutch operably connected to the starter interface gear; and
      a plurality of stacked planetary gear systems operably connected to the core-turning clutch and a core-turning input; and
   a mounting pad comprising an interface to couple a core-turning motor to the core-turning input of the reduction gear train.

2. The system of claim 1, wherein the starter interface gear engages a planet gear of the starter gear train, and the starter gear train is operably connected to the accessory gearbox through a starter clutch.

3. The system of claim 1, wherein the core-turning clutch is an overrunning clutch.

4. The system of claim 1, wherein the stacked planetary gear systems further comprise a stacked series of coaxially aligned sun gears that each drives a plurality of planet gears.

5. The system of claim 4, wherein a distal sun gear is operably connected by a drive shaft to the core-turning input, and the distal sun gear is operably connected to a first set of the planet gears of the stacked planetary gear systems.

6. The system of claim 5, wherein the first set of planet gears is operably coupled to a carrier comprising one of the coaxially aligned sun gears that in turn drives one or more subsequent sets of the planet gears and the coaxially aligned sun gears.

7. The system of claim 6, wherein the stacked planetary gear systems comprise four planetary gear systems coaxially positions about the drive shaft, and the core-turning clutch is coaxially positioned about the drive shaft between the stacked planetary gear systems and the core-turning motor.

8. An integrated starter and core-turning system for a gas turbine engine, the integrated starter and core-turning system comprising:
   a starter comprising a starter gear train that interfaces to an accessory gearbox of the gas turbine engine; and
   a reduction gearbox comprising:
      a reduction gear train operable to drive rotation of the starter gear train, the reduction gear train comprising:
         a starter interface gear operably connected to the starter gear train;
         a core-turning clutch operably connected to the starter interface gear; and
         a plurality of stacked planetary gear systems operably connected to the core-turning clutch and a core-turning input; and
      a mounting pad comprising an interface to couple a core-turning motor to the core-turning input of the reduction gear train.

9. The integrated starter and core-turning system of claim 8, wherein the starter interface gear engages a planet gear of the starter gear train, and the starter gear train is operably connected to the accessory gearbox through a starter clutch.

10. The integrated starter and core-turning system of claim 8, wherein the core-turning clutch is an overrunning clutch, the starter comprises a turbine that drives the starter gear train, and the core-turning motor is an electric motor.

11. The integrated starter and core-turning system of claim 8, wherein the stacked planetary gear systems further comprise a stacked series of coaxially aligned sun gears that each drives a plurality of planet gears.

12. The integrated starter and core-turning system of claim 11, wherein a distal sun gear is operably connected by a drive shaft to the core-turning input, and the distal sun gear is operably connected to a first set of the planet gears of the stacked planetary gear systems.

13. The integrated starter and core-turning system of claim 12, wherein the first set of planet gears is operably coupled to a carrier comprising one of the coaxially aligned sun gears that in turn drives one or more subsequent sets of the planet gears and the coaxially aligned sun gears.

14. The integrated starter and core-turning system of claim 13, wherein the stacked planetary gear systems comprise four planetary gear systems coaxially positioned about the drive shaft, and the core-turning clutch is coaxially positioned about the drive shaft between the stacked planetary gear systems and the core-turning motor.

15. The integrated starter and core-turning system of claim 8, wherein the starter and the reduction gearbox are integrally formed within an outer housing.

16. A method of installing a reduction gear train through a starter of a gas turbine engine, the method comprising:
   arranging a plurality of stacked planetary gear systems of the reduction gear train in a reduction gearbox;
   coupling the stacked planetary gear systems with a core-turning clutch operably connected to a starter interface gear;

engaging the starter interface gear with a starter gear train of the starter that interfaces to an accessory gearbox of the gas turbine engine;

aligning a drive shaft coaxially with the stacked planetary gear systems and the core-turning clutch; and coupling a core-turning motor with the reduction gear train at a core-turning input of the drive shaft.

17. The method of claim 16, wherein the stacked planetary gear systems further comprise a stacked series of coaxially aligned sun gears that each drives a plurality of planet gears.

18. The method of claim 17, further comprising:

engaging a distal sun gear operably connected to the drive shaft with a first set of the planet gears operably coupled to a carrier comprising one of the coaxially aligned sun gears configured to drive one or more subsequent sets of the planet gears and the coaxially aligned sun gears.

19. The method of claim 16, wherein the starter interface gear engages a planet gear of the starter gear train, and the starter gear train is operably connected to the accessory gearbox through a starter clutch.

20. The method of claim 16, further comprising coupling a first housing portion of the reduction gearbox with a second housing portion of the starter to establish an integrally formed outer housing of the reduction gearbox and the starter.

* * * * *